Nov. 16, 1926.
J. W. HOOLEY
1,606,789
REMOVABLE JUNCTION SLEEVE
Filed Nov. 20, 1925
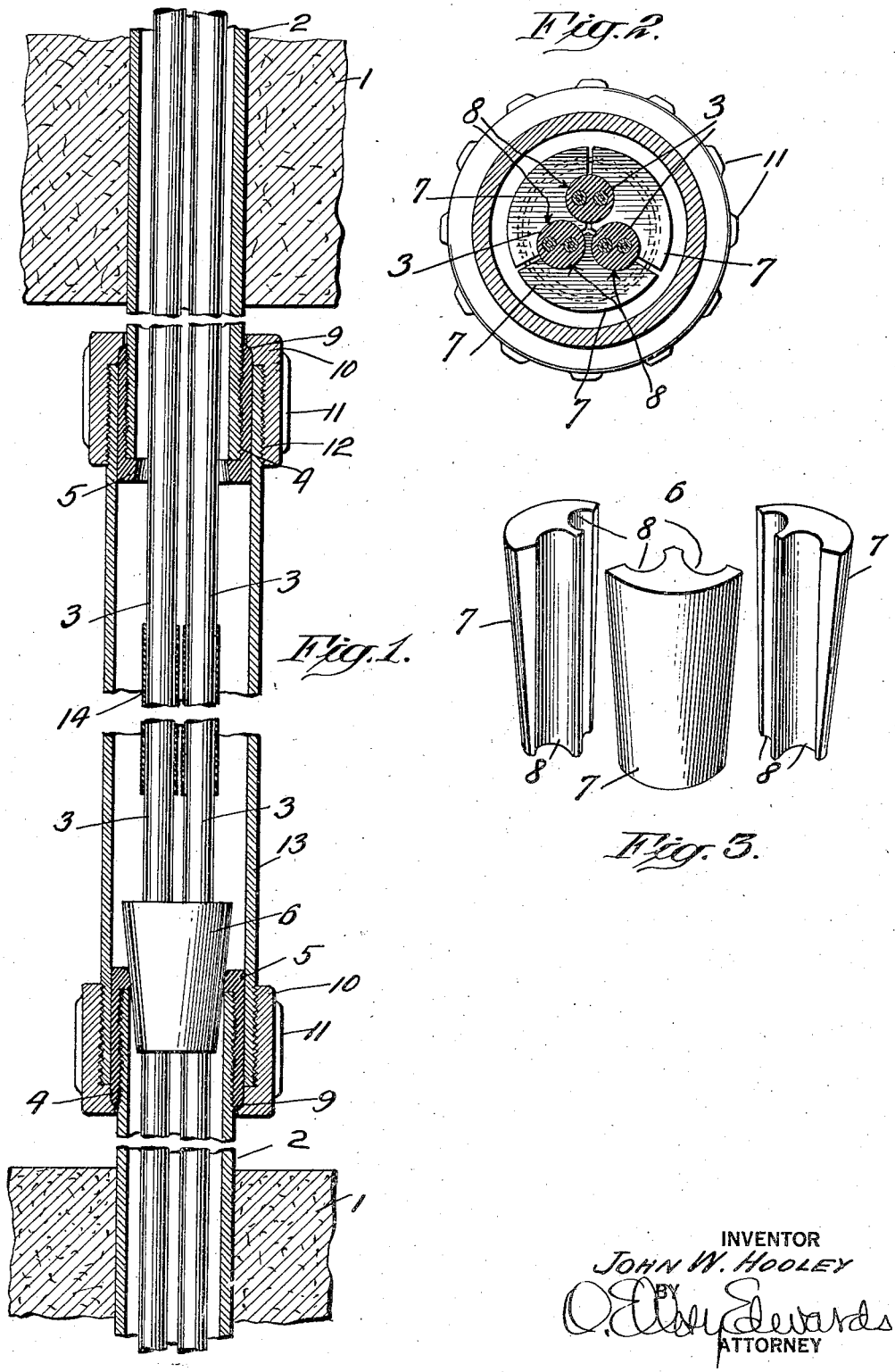
INVENTOR
JOHN W. HOOLEY
BY
O. Ellis Edwards
ATTORNEY Patented Nov. 16, 1926.

1,606,789

UNITED STATES PATENT OFFICE.

JOHN W. HOOLEY, OF LARCHMONT, NEW YORK.

REMOVABLE JUNCTION SLEEVE.

Application filed November 20, 1925. Serial No. 70,247.

The object of my invention is to provide a sleeve of this class which will make unnecessary the use of a junction box where wires are passed in a building in the conventional manner.

For a more detailed description of my invention, reference is to be had to the accompanying drawings, forming a part hereof, in which—

Figure 1 is a longitudinal view of a conduit with wires and my improved sleeve.

Figure 2 is a sectional view of the same.

Figure 3 is a perspective view of a cable or wire holder.

Throughout the various views of the drawings, similar reference characters designate similar parts.

1 indicates a building in which are mounted the usual tubes 2, which are fixed in the building in any suitable manner. These tubes receive wires or cables 3 which are drawn through in the conventional way. The end of each tube, which is exposed, is screw threaded at 4 and provided with a suitable sleeve 5 which rests over the end of the tube and has a conical bore which receives a perforated plug 6 and forces the same into intimate contact with the wires so that the wires are securely held. This plug, in the preferred embodiment of my invention, is formed of three parts 7, which, when taken together, have an exterior surface which is the frustrum of a cone so it will fit snug in the sleeve 5, as indicated, and they also have three bores 8 for the cables 3.

Each sleeve 5 has a rounded end 9 which engages a sleeve 10 with projections 11 mounted thereon by means of which it may be turned. This sleeve is screw threaded at 12 to engage corresponding threads on the removable junction sleeve 13.

In view of the foregoing, the use of my improved removable junction sleeve will be readily understood. Assuming the wires and conduits to be in place, as above described, and the sleeves 5 mounted thereon and the plug 6 in place with its component parts gripping the wires, as above set forth, the wires or cables are then passed through the sleeve 13 which is released from one sleeve 10, but secured to the other and shoved along a tube 2 out of the way. After the wires 3 have been properly connected and covered by insulation tape 14, in the conventional manner, the sleeve 13 is then raised to its proper position so as to cover the wires and their connecting tapes and then the other sleeve 10 is turned true so as to hold the removable junction sleeve 13 in place. When it is desired to get at the connections between the ends of the wires 3, one of the sleeves 10 can be unscrewed and then the removable junction sleeve 13 can be slid, as above described, and access can be had to the joints.

While I have shown and described one embodiment of my invention, it is obvious that it is not restricted thereto, but that it is broad enough to cover all structures that come within the scope of the annexed claims.

Having thus described my invention, what I claim is:

1. Two conduits, a sleeve threaded on the end of each conduit a substantial distance and having at one end an internal shoulder adapted to cooperate with the end of each conduit and at the other end being rounded, a junction sleeve extending between the two conduits and a substantial distance over said sleeves, a second sleeve threaded upon each end of said junction sleeve and having an internal shoulder engaging said rounded end upon said first mentioned sleeves.

2. Two conduits with screw threads at their adjacent ends, a sleeve, threaded on each of such ends extending a substantial distance, a junction sleeve extending between the two conduits and a substantial distance over said sleeves, two more sleeves, one threaded on each end of said junction sleeve and having an internal shoulder engaging an end upon one of said first mentioned sleeves.

In testimony whereof, I have hereunto set my hand this 17th day of November, 1925.

JOHN W. HOOLEY.